US009637261B2

(12) United States Patent
Monti

(10) Patent No.: US 9,637,261 B2
(45) Date of Patent: May 2, 2017

(54) PACKING APPARATUS IN A STERILE ENVIRONMENT WITH A LOADING AND SUPPLY SYSTEM OF ARTICLES

(71) Applicant: Marchesini Group S.p.A., Pianoro (Bologna) (IT)

(72) Inventor: Giuseppe Monti, Pianoro (IT)

(73) Assignee: Marchesini Group S.p.A., Pianoro (Bologna) (IT)

(*) Notice: Subject to any disclaimer, the term of this patent is extended or adjusted under 35 U.S.C. 154(b) by 705 days.

(21) Appl. No.: 14/133,862

(22) Filed: Dec. 19, 2013

(65) Prior Publication Data

US 2014/0165500 A1    Jun. 19, 2014

(30) Foreign Application Priority Data

Dec. 19, 2012    (IT) .......................... BO2012A000686

(51) Int. Cl.
*B65B 55/12* (2006.01)
*B65G 65/23* (2006.01)
(Continued)

(52) U.S. Cl.
CPC .............. *B65B 55/12* (2013.01); *B65G 65/23* (2013.01); *B67B 1/005* (2013.01); *B67B 1/03* (2013.01); *B67B 3/003* (2013.01); *B67B 3/06* (2013.01)

(58) Field of Classification Search
CPC ... B65B 7/2807; B65B 55/025; B65B 55/027; B65B 55/12–55/19;
(Continued)

(56) References Cited

U.S. PATENT DOCUMENTS 4,705,444 A * 11/1987 Tullis ................ H01L 21/67772
118/729
4,805,765 A    2/1989 Barrett et al.
(Continued)

FOREIGN PATENT DOCUMENTS

EP    0246711 A2    11/1987
FR    2880010 A1    6/2006
(Continued)

OTHER PUBLICATIONS

European Search Report for corresponding EP application 13 19 8034, (published as EP 2746202 A1), completed Mar. 12, 2014, 3 pages.

*Primary Examiner* — Stephen F Gerrity
*Assistant Examiner* — Joshua Kotis
(74) *Attorney, Agent, or Firm* — R. Neil Sudol; Henry D. Coleman

(57) ABSTRACT

A packing apparatus for use in a sterile environment has an article loading and supply system. The loading system has a hatch in a first wall (P1) positioned at a height corresponding to a normal and ergonomic working height for an operator. The hatch faces an operating station which is to be supplied with the articles. A container element (2) has an internal volume (25) for containing articles, with a first article loading opening (21) and a second article unloading opening (22). The container element (2) is positioned in the sterile environment and is movable so that it can be positioned in a lowered position (PA) which corresponds to the hatch position for loading articles through the first loading opening, and then positionable in a raised position (PS) in which the second loading opening (22) is above the operating station (S1) for unloading the articles to be supplied thereto.

14 Claims, 7 Drawing Sheets

(51) Int. Cl.
*B67B 1/03* (2006.01)
*B67B 1/00* (2006.01)
*B67B 3/00* (2006.01)
*B67B 3/06* (2006.01)

(58) Field of Classification Search
CPC ..... B67B 3/06–3/0645; B67B 7/0073–7/0086; B67B 1/005; B67B 3/003; B67B 1/03; B65G 65/23; B65G 65/24; B65G 65/30; B65G 65/32; B65G 65/40; H01L 21/67772; B67C 7/0073–7/0086
USPC .................. 53/425, 426, 167, 168, 306–312; 312/31–31.3; 901/15, 16, 31, 39
See application file for complete search history.

(56) References Cited

U.S. PATENT DOCUMENTS

| | | | | |
|---|---|---|---|---|
| 5,064,337 A | * | 11/1991 | Asakawa | H01L 21/67769 414/274 |
| 5,447,699 A | * | 9/1995 | Papciak | A61L 2/26 141/85 |
| 5,628,604 A | * | 5/1997 | Murata | H01L 21/67769 414/283 |
| 5,715,659 A | * | 2/1998 | Norton | B65B 55/027 414/292 |
| 6,006,946 A | * | 12/1999 | Williams | B65G 1/045 221/2 |
| 6,119,737 A | * | 9/2000 | Yuyama | B65B 5/103 141/104 |
| 6,142,722 A | * | 11/2000 | Genov | G03F 7/70741 414/217 |
| 6,396,072 B1 | * | 5/2002 | Meyhofer | G06M 1/101 250/239 |
| 6,410,455 B1 | * | 6/2002 | Kuribayashi | H01L 21/67742 414/217 |
| 7,198,447 B2 | * | 4/2007 | Morimitsu | H01L 21/67757 414/217 |
| 8,753,063 B2 | * | 6/2014 | Rebstock | H01L 21/67201 414/416.03 |
| 2004/0123560 A1 | * | 7/2004 | Monti | B65B 7/2807 53/201 |
| 2009/0223592 A1 | * | 9/2009 | Procyshyn | B25J 21/00 141/2 |

FOREIGN PATENT DOCUMENTS

| | | |
|---|---|---|
| FR | 2952916 A1 | 5/2011 |
| JP | s53 50981 U | 4/1978 |
| WO | WO2006/041302 A1 | 4/2006 |
| WO | WO2011/066839 A1 | 6/2011 |

* cited by examiner

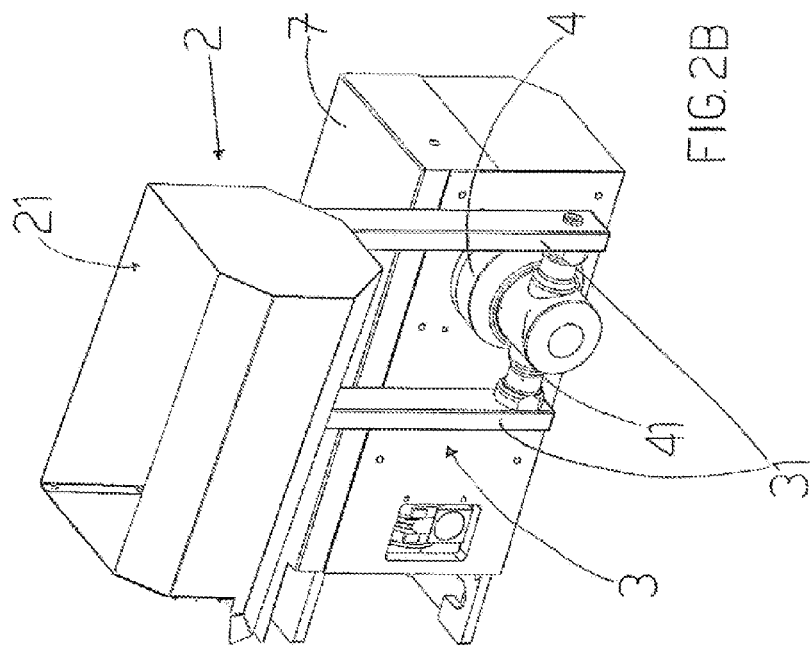
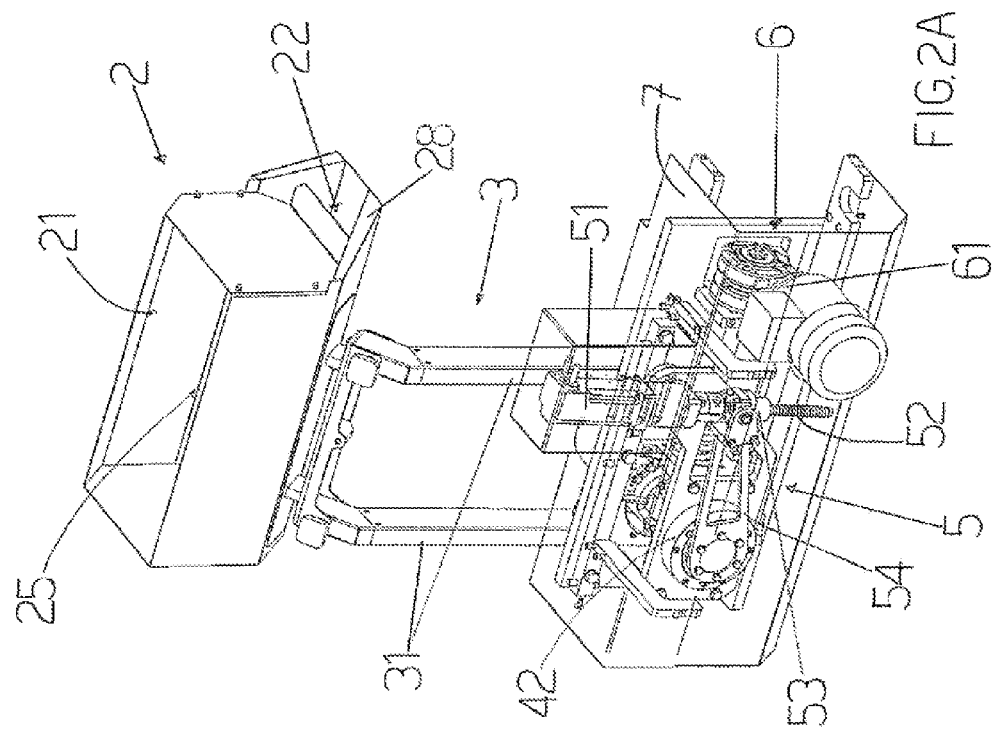

PACKING APPARATUS IN A STERILE ENVIRONMENT WITH A LOADING AND SUPPLY SYSTEM OF ARTICLES

FIELD OF THE INVENTION

The present invention relates to the particular technical sector concerning apparatus located and operating in a sterile environment, i.e. located internally of an environment which is maintained in a controlled atmosphere in such a way that the apparatus can carry out the packing operations in sterile and aseptic conditions.

DESCRIPTION OF THE PRIOR ART

This particular type of packing in a sterile/aseptic environment is normally carried out as part of the packing of pharmaceutical products, such as the packing of capsules, tablets, or substances or suspensions in liquid form, into relative bottles that are then to be capped with relative safety caps.

In these cases, the packing apparatus include a line along which the various operating stations that will perform all the various operations and stages of packing of pharmaceutical products are arranged.

The line of the apparatus and all the various operating stations associated with it are therefore arranged internally of an environment where the atmosphere is maintained in a particular condition of sterility, by means of isolation thereof from the surrounding environment, and by providing appropriate downward laminar flows which will involve all parts of the equipment arranged within this sterile environment. The controlled atmosphere environment is created by using of a series of walls and panels that are joined together and assembled so as to identify between them a sort of "tunnel", physically separated from the surrounding environment, long, and within which the line develops, the various operating stations of the apparatus being arranged there.

In this situation, however, it is necessary to ensure from outside this environment/tunnel the supply and provision of articles to within the sterile environment of the apparatus; these articles will then be used in various packing operations.

For example, in the above-mentioned case of packing pharmaceutical products/substances inside bottles, there is a need to supply and provide caps to the operating station of the apparatus predisposed to accumulate the caps, which will then be used to seal the bottles and complete the packing thereof.

In this case, the apparatus includes a special operating station within the sterile environment, which station is equipped with a storing hopper that has to be constantly and regularly supplied with caps, since packing apparatus usually work at a continuous regime.

Clearly the loading and supplying operations of the caps into the hopper located within the sterile environment must take place in such a way as not to alter the conditions of sterility in the environment, i.e. they must be done according to procedures which are such as to prevent any external contamination (dust, etc.) from being introduced to within the sterile environment during the loading of the caps. The prior art includes packing equipment in a sterile environment with automatic systems for loading and supplying articles, such as caps, which include a hatch realised and predisposed one of the walls which identify the sterile environment of the apparatus, so as to be positioned facing the operating station that is to be supplied with the articles, such as, for example, a hopper in the case of caps for bottles, in such a position as to be at a height corresponding to the height from the ground of the supplying zone of the operating station. In the above-described case this might be for example at the top of the hopper.

The loading systems currently used further provide a kind of cabin designed and located so as to be in contact with the wall and at the hatch position, so as to create a working environment for an operator, which is maintained under conditions of sufficient sterility, though in a less rigorous and strict way than the conditions present in the environment where the packing apparatus is located and operates.

The known loading systems also provide, internally of the cabin, a conveyor element comprising an inclined sliding plane, such as a chute, which is arranged at the hatch position and has a first loading end located in the cabin and a second unloading end located internally of the sterile environment of the apparatus at the supply zone of the operating station, for example at the top of the hopper.

Clearly this conveyor element must be predisposed so as to have the first loading end positioned higher than the second unloading end.

The operator then has to enter internally of the cabin with bags in which the articles, such as caps, have previously been packed, open the bag and tip the caps present in the bag into the loading end of the conveyor element: the caps will then be made to slide down the inclined plane to the unloading end above the hopper, whence they will fall into the hopper.

This mode of loading and supplying incurs drawbacks.

First, the operator must lift the bag each time to bring it up to the level at which the loading end of the conveyor element is positioned, and tip a part or all of the articles/caps therein: these operations are not at all simple and are also very laborious.

In fact, the supply zone of the operating station of the packing apparatus internally of the sterile environment, such as for example the top of a hopper for the storing caps for closing bottles, is not located at a normal working height, i.e. ergonomic and uniform for an operator, and therefore both the hatch in the wall and the loading end of the conveyor element are positioned at such a height that the operator has to fully raise his or her arms, or to make use of a step-ladder.

Secondly, the conveyor element is positioned astride two different environments, with the loading end located in the cabin and the unloading end located in the sterile environment where the apparatus operates.

This situation can lead to the onset of potential contamination situations where the sterile apparatus has to perform the packing operations in perfectly aseptic and sterile conditions.

Further, the need to design a cabin projecting from a wall of the walls defining the sterile environment/tunnel, within which the packing apparatus line develops, can cause size, design and layout problems relating to the apparatus and reduce vision of some parts of the apparatus which require a constant visual inspection so that any eventual malfunctions can be detected.

Lastly, in the equipment having these loading systems there is no control on the mode of supply of the articles because once they have been tipped by the operator onto the loading end of the conveyor element they will slide and fall, indiscriminately through the hatch, directly into the supply zone of the operating station, possible filling it with an excessive number of articles with respect to production needs of the other operating stations at that particular moment.

SUMMARY OF THE INVENTION

The aim of the present invention is therefore to provide a packing apparatus in a sterile environment with a loading and supply system of articles, able to obviate the above-cited drawbacks present in the prior art.

In particular, an aim of the present invention is to provide a packing apparatus in a sterile environment with a loading and supply system that simplifies the operations requested by the operator performing the loading operations, which prevents the onset of potential situations of contamination of the sterile environment, within which the packing apparatus works and which also enables controlling the article supply modes.

The above-cited aims are obtained according to a packing apparatus in a sterile environment with the loading and supply system of articles the apparatus comprising a series of walls assembled to one another and predisposed in such a way as to identify and circumscribe an isolated environment from a surrounding environment. In the isolated environment, measures are predisposed to maintain the isolated environment in a sterile and aseptic condition, as well as at least one line and a series of operating stations associated to the line for the packing operations, and a loading and supply system. The system comprises a hatch, realized and predisposed on a first wall of the series of walls so as to be facing and in proximity of an operating station, and in a position so as to be at a height from a ground level corresponding to a normal, ergonomic and unified working height for an operator. A container element for containing articles has a shape that exhibits an internal volume for containing articles. A first load opening communicates with the internal volume, for loading the articles into the internal volume. A second unloading opening, communicates with the internal volume, for unloading the articles from the internal volume to move them out of the container element, with the container element being predisposed so as to be positioned internally of the isolated environment, in a zone in proximity of the operating station to be supplied with the articles. The container elements is further predisposed so as to be movable both with respect to the operative station and the hatch so that it is movable in order to be positioned in a lowered position at the hatch, so that the first load opening is positioned at the hatch which enables loading articles into the internal volume via the hatch and the first load opening. Thereafter, it is movable to be positioned in a raised position so that the second unloading opening is positioned above the supply zone of the operating station to be supplied with the articles and with an orientation and configuration such that the articles contained in the internal volume remain within the volume. When positioned in the raised position, the container element is further movable in such a way that the articles contained in the internal volume are directed towards the second unloading opening to be unloaded to outside of the container element at the supply zone of the operating station. The loading and supply system of the packing apparatus further comprises a support frame for the container element, positioned internally of the isolated environment, in a zone in proximity to the operating station to be supplied with the articles, and mounted with respect to a second wall opposite the first wall, so as to be movable in rotation about a first rotation axis parallel to the second wall. The container element is movable so as to be positionable in the lowered position and in the raised position, and is further movable in rotation about a second rotation axis, perpendicular to the first rotation axis and perpendicular to the second wall. When the container element is positioned in the raised position, it can be moved in rotation about the second rotation axis, so that the articles contained in the internal volume are directed towards the second unloading opening for unloading the container element to the outside at the supply zone.

Further advantageous characteristics of the packing apparatus with the loading and supply system of articles proposed in the present invention are described further below.

BRIEF DESCRIPTION OF THE DRAWINGS

The characteristics of the packing apparatus in a sterile environment with a loading and supply system of articles provided by the present invention are described in the following with reference to the appended tables of drawings, in which:

FIGS. 2A and 2B illustrate, in perspective views from different angles, particularly significant components of the loading system of the packing equipment of the present invention;

DESCRIPTION OF THE PREFERRED EMBODIMENTS

Packing apparatus working in a sterile environment are specially designed, as reported herein above, to operate internally of an isolated environment from the surrounding environment which is maintained in specially sterile and aseptic conditions so as to guarantee the sterile packing of products, such as for example the packing of pharmaceutical products/substances internally of bottles which are then hermetically sealed with special closing caps.

Figure 1A:
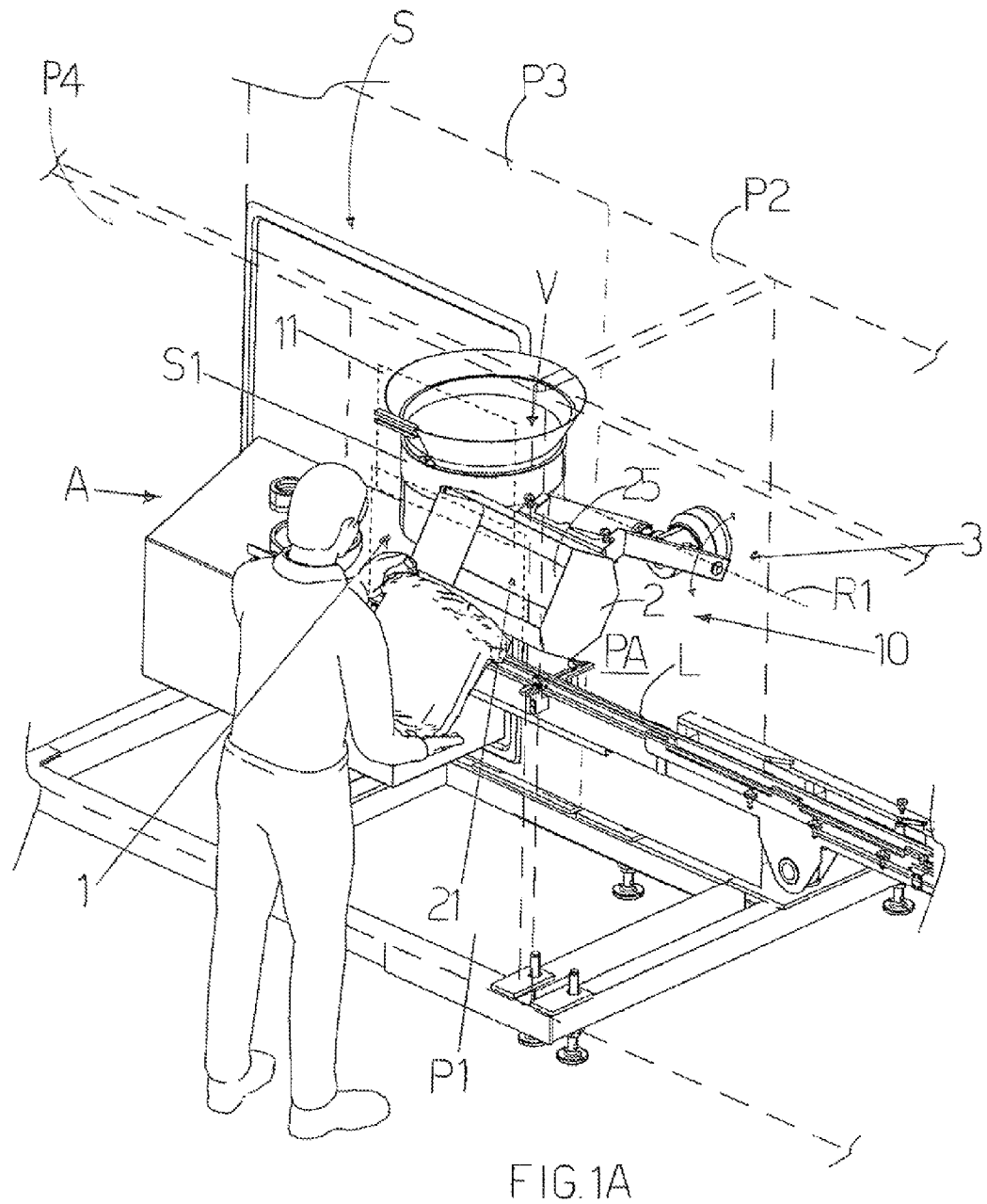
FIGS. 1A and 1B illustrate, according to perspective views, a sterile environment of a packing apparatus with a system of loading and feeding articles of the present invention, with the loading system illustrated in two respective different operating positions, respectively of loading the articles and supplying the articles to the supply zone of an operating station of the apparatus that is to be supplied with articles for the packing operations thereof.
Figure 1B:
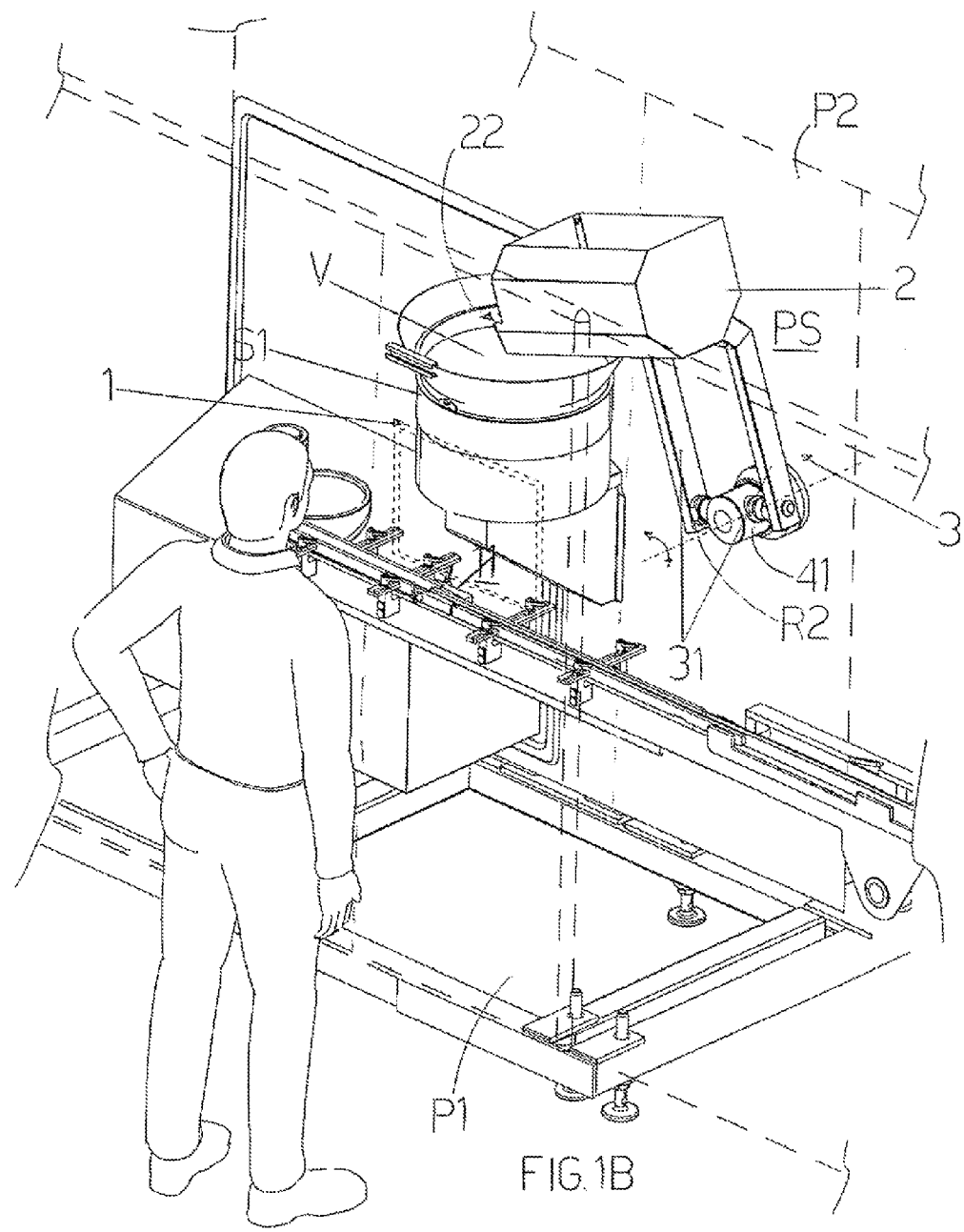
Figure 3:
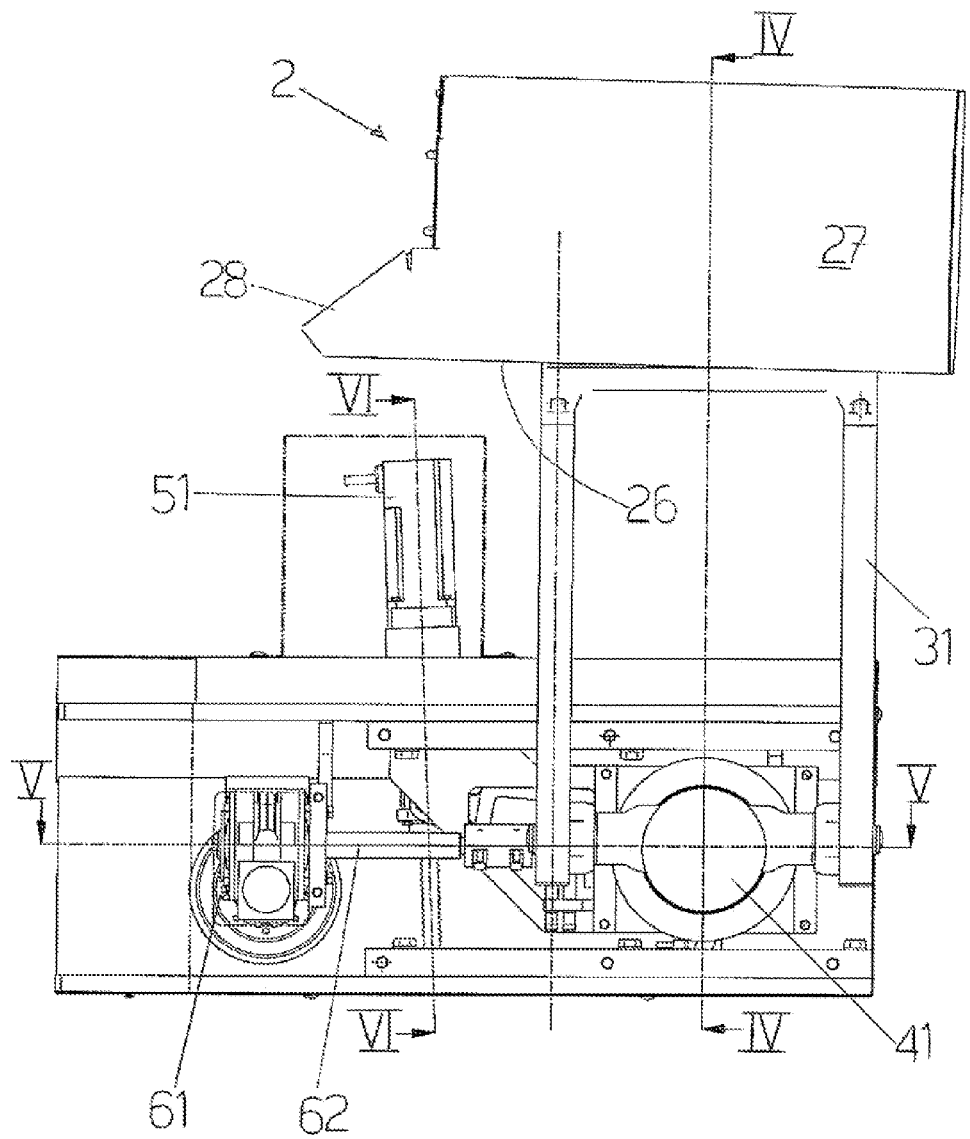
FIG. 3 is a front view of an assembly of components of the loading system.
Figure 4:
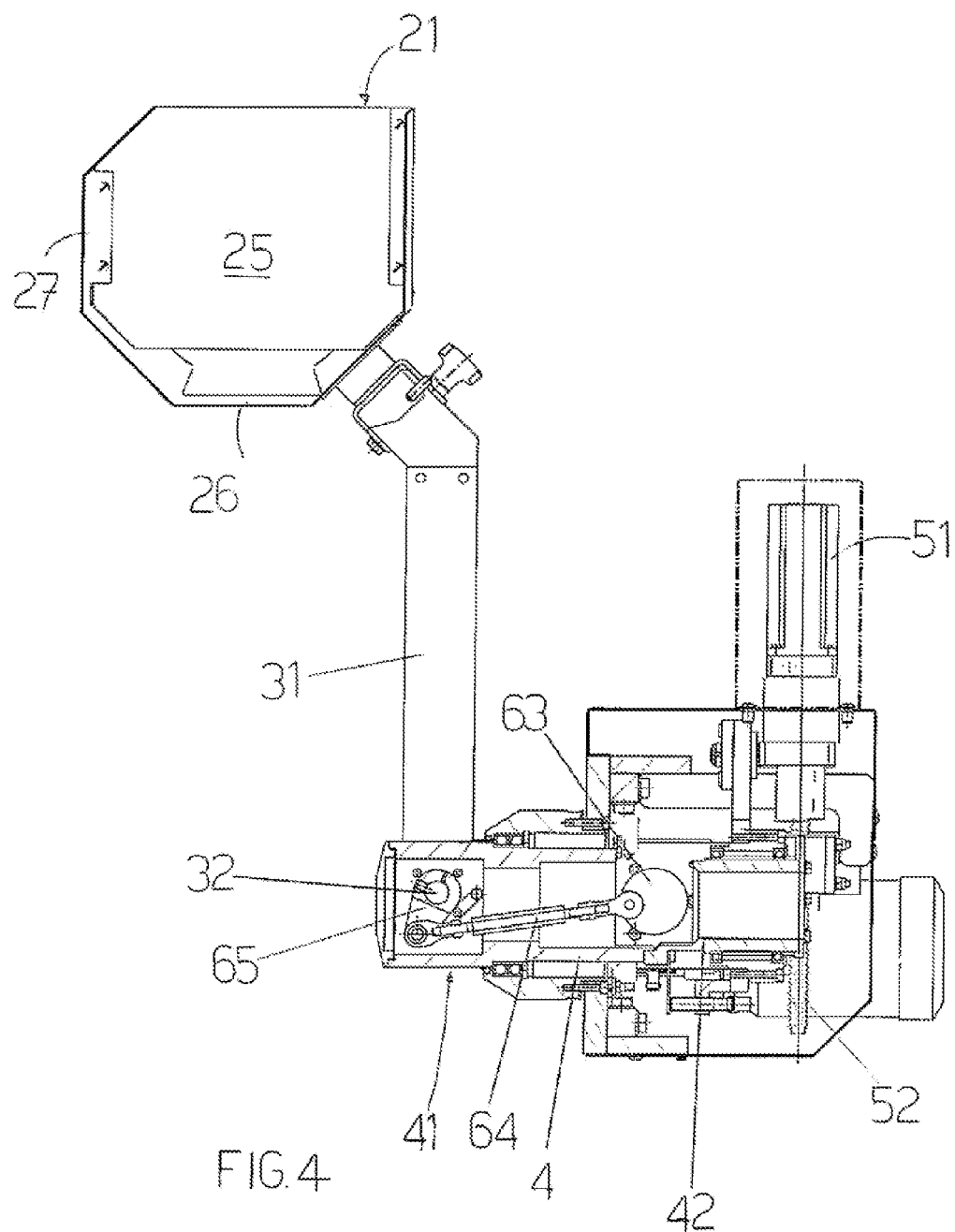
FIG. 4 is a section view along section plane IV-IV of FIG. 3.

In the figures, reference (A) denotes in its entirety a packing station which operates in a sterile environment which comprises, as described for example schematically in FIGS. 1A, 1B, a series of walls (P1, P2, P3, P4) assembled to one another and predisposed in such a way as to identify and circumscribe an isolated environment (S) from a surrounding environment.

The apparatus (A) includes, internally of the isolated environment (S), special measures for maintaining the isolated environment (S) in sterile and aseptic conditions.

In this isolated environment (S), the apparatus (A) comprises at least a line (L) and a series of operating stations associated to the line (L) for the packing operations.

The packing apparatus (A) comprises a loading and supply system, denoted in its entirety in the accompanying figures by reference numeral (10), which is predisposed and suitable for loading articles and supplying the articles to an operating station (S1) of the operating stations of the apparatus (A) which is internal of the isolated environment (S), the articles then being used by the apparatus with the various relative other operating stations for carrying out and completing all the packing operations.

For example, in the accompanying figures, in particular in FIGS. 1A and 1B, an apparatus (A) is illustrated with comprises an operating station (S1) constituted by a vibrating hopper in which the caps required for closing bottles which the other operating stations of the apparatus (not illustrated) will have filled with pharmaceutical products/substances.

The loading and supply system (10) of the articles comprises a hatch (1), realized and predisposed on a first wall (P1) of the walls (P1, P2, P3, P4) such as to be facing and in proximity of an operating station (S1) of the apparatus (A) which is provided with a supply zone (V) to be supplied with articles to be used for the packing operations.

For example, in the above-mentioned case, the supply zone (V) is constituted by the top of the hopper.

The peculiarities of the apparatus (A) consist in the fact that the loading system (10) includes that the hatch (1), differently to the prior art systems, is realized and predisposed on the first wall (P1) in a position such as to be at a height from a ground level corresponding to a normal, ergonomic and unified working height for an operative, being 1.5 meters from the ground, and wherein the loading and supply system (10) comprises a container element (2) for containing articles having a shape that is such as to exhibit an internal volume (25) for containing articles, a first load opening (21) communicating with the internal volume (25), for loading the articles into the internal volume (25), and a second unloading opening (22), communicating with the internal volume (25), for unloading the articles from the internal volume (25) to externally of the container element (2), and which is predisposed such as to be positioned internally of the isolated environment (S) in a zone in proximity of the operating station (S1) which is to be supplied with the articles.

A further special characteristic consists in the fact that the container element (2) is predisposed and configured so as to be movable with respect both to the operating station (S1) and the hatch (1) such that it is movable in order to be positioned in a lowered position (PA) at the hatch (1) so that the first load opening (21) is positioned at the hatch (1), such as to enable loading of the articles into the internal volume (25) via the hatch (1) and the first load opening (21), successively, it is movable to be positioned in a raised position (PS) in such a way that the second unloading opening (22) is positioned above the supply zone (V) of the operating station (S1) to be supplied with the articles and with an orientation and configuration such that the articles contained in the internal volume (25) remain within the volume (25), and, when it is positioned in the raised position (PA), the container element (2) is further movable in such a way that the articles contained in the internal volume (25) are directed towards the second unloading opening (22) to be unloaded to outside the container element (2) at the supply zone (V) of the operating station (S1).

Thanks to these special aspects, the packing apparatus (A) with the loading system (10) previously described exhibits following advantages.

Once the sterile bag has been opened the operator, internally of which the articles to be supplied to the operating station (S1) of the apparatus have been packed, can carry out loading operations in a working position that is perfectly ergonomic as he or she does not have to raise his or her arms or climb up step-ladders as the hatch is positioned at unified ergonomic height (of 1.5 meters as mentioned herein above).

The articles contained in the bag are directly loaded internally of the isolated environment (S) without the use of other means or elements that project from the walls circumscribing the isolated environment (S), since the container element (2), predisposed internally of the isolated environment (S), can be moved and positioned in the lowered position (PA), with the relative first loading opening (21) positioned at the hatch (1), and therefore the articles present internally of the bag are directly loaded into the volume (25) of the container element (2) through the hatch (1) and the loading opening (21) of the container element (2).

Lastly, the supplying of the articles into the supply zone (V) of the operating station (S1) occurs in entirely automatic mode, and is therefore controllable by an appropriate control unit as the container element (2), once loaded with the articles using the above-mentioned modes, is then moved so as to be positioned in the raised position (PS), with the second unloading opening (22) positioned above the supply zone (V), and therefore, once positioned in the raised position (PA), the container element (2) is further moved so that the articles contained in the internal volume (25) are directed towards the second unloading opening (22) so that they can be unloaded externally of the container element (2) at the supply zone (V) of the operating station (S1).

For this purpose, the container element (2) is predisposed, as mentioned herein above, so that when it is moved and positioned in the raised position (PS), it maintains an orientation and a configuration such that the articles contained in the internal volume (25) remain in the volume (25).

This enables waiting for the articles previously supplied to the supply zone (V) of the operating station (S1) to be effectively used by the apparatus before proceeding with a new supply, and therefore regulating and controlling the effective supply frequency of the articles so that only the required number of articles is supplied to the operating station (S1) for correct functioning thereof.

In this regard, the packing apparatus (A) usually includes sensor means for controlling and detecting the filling level of the supply zone (V) of the operating station (S1) which is to be supplied with the articles: when the sensors detect that the level of the articles is falling to an insufficient level, the container element (2) positioned in the raised position (PS) can be commanded to be moved so as to direct the articles contained therein towards the second unloading opening (22), so that they can be unloaded at the supply zone (V).

Further, the loading system (10) comprises a support frame (3) of the container element (2) which is predisposed in such a way as to be positioned internally of the isolated environment (S), in a zone in proximity of the operating station (S1) of the apparatus (A) which is to be supplied with the articles, and mounted with respect to a second wall (P2) of the walls (P1, P2, P3, P4) which circumscribe the isolated environment (S), opposite the first wall (P1), in such a way as to be movable in rotation about a first rotation axis (R1) parallel to the second wall (P2), in such a way that the container element (2) can be movable in order to be positionable in the lowered position (PA) and in the raised position (PS) (see for example FIG. 1A).

The frame (3) is predisposed and mounted with respect to the second wall in such a way as to be further movable in rotation about the second rotation axis (R2), perpendicular to the first rotation axis (R1) and perpendicular to the second wall (P2), so that the container element (2), when positioned in the raised position (PS), can be moved in rotation about the second rotation axis (R2), in such a way that the articles contained in the internal volume (25) are directed towards the second unloading opening (22) for unloading them externally of the container element (2) at the supply zone (V) of the operating station (S1) (see for example FIG. 1B).

A particularly advantageous characteristic relates to the fact that the frame (3) when the container element (2) has been positioned in the raised position (PS), is movable in alternating oscillating rotation about the second rotation axis (R2) such as to control and regulate the unloading of the articles from the second unloading opening (22) towards the supply zone (V) of the operating station (S1) of the apparatus (A) to be supplied with the articles.

In this way the flow of articles unloaded in the supply zone (V) can be regulated and controlled so as to prevent all the articles present in the container element (2) from being contemporaneously unloaded in the supply zone (V).

Further, the frame (3) an be movable about the second rotation axis (R2), for example with the above-mentioned alternating oscillating motion (vibratory), so as to unload only a part of the articles contained internally of the internal volume (25) of the container element (2) in the supply zone (V) of the operating station (S1), according to the effective needs of the operating station (S1), detected as mentioned herein above by the sensor means included for this purpose.

This is without doubt an advantage with respect to the prior art, where the operator unloaded all the contents of the bag onto the conveyor element which via the relative inclined sliding plane then unloaded, with no control, all the articles indiscriminately into the supply zone (V).

For the predisposing and movement of the frame (3) internally of the isolated environment (S), the apparatus (A) comprises a hub (4), having a rotation axis (40), which hub (4) is predisposed and mounted at the second wall (P2) in such a way as to sealably cross the second wall (P2) and to be placeable in rotation with respect thereto about the rotation axis (40) thereof.

In this regard, the hub (4) has dimensions that are such as to exhibit a first portion (41) internally of the isolated environment (S) and a second portion (42) externally thereof, with the hub (4) being predisposed on the second wall (P2) in such a way that the rotation axis (40) thereof coincides with the second rotation axis (R2) of the frame (3).

In turn, the frame (3) comprises two arms (31) and a shaft (32) having a rotation axis (320), with the two arms (31) rigidly mounted on the ends of the shaft (32) and wherein the shaft (32) is predisposed and mounted in such a way as to cross the first portion (41) of the hub (40), which is internal of the isolated environment (S), such that the relative rotation axis (320) is perpendicular to the axis (40) of the hub (4) and coinciding with the first rotation axis (R1) of the frame (3).

The shaft (32) is activatable in rotation, with respect to the first portion (41) of the hub (40), about the first rotation axis (320) and therefore about the first rotation axis (R1) such as to set the arms (31) and the frame (3) in rotation, and thus the container element (2), about the first rotation axis (R1) such that the container element (2) can be movable in rotation and positionable in the lowered position (PA) and the raised position (PS).

For the activation in rotation of the hub (4) and the shaft (32), the loading system (10) comprises respectively a first actuator group (5) and a second actuator group (6) which are predisposed externally of the second wall (P2) (see for example FIG. 2A).

The first actuator group (5) comprises a motor (51) and a series of motion transmission elements (52, 53, 54) which are predisposed such as to be connected to the second portion (42) of the hub (4) for activating the hub (4) in rotation and in alternating oscillating motion about the axis (40) thereof, and therefore of the frame (3) and the container element (2) about the second rotation axis (R2).

The second actuator group (6) comprises a motor (61) and a series of motion transmission elements (62, 63, 64, 65) which are predisposed such as to be connected to the shaft (32) of the frame (3), to ends of which the two arms (31) of the frame (3) are rigidly connected, for activation in rotation of the shaft (32) about the rotation axis (320) thereof and therefore of the frame (3) and the container element (2) about the first rotation axis (R1).

Figure 6:
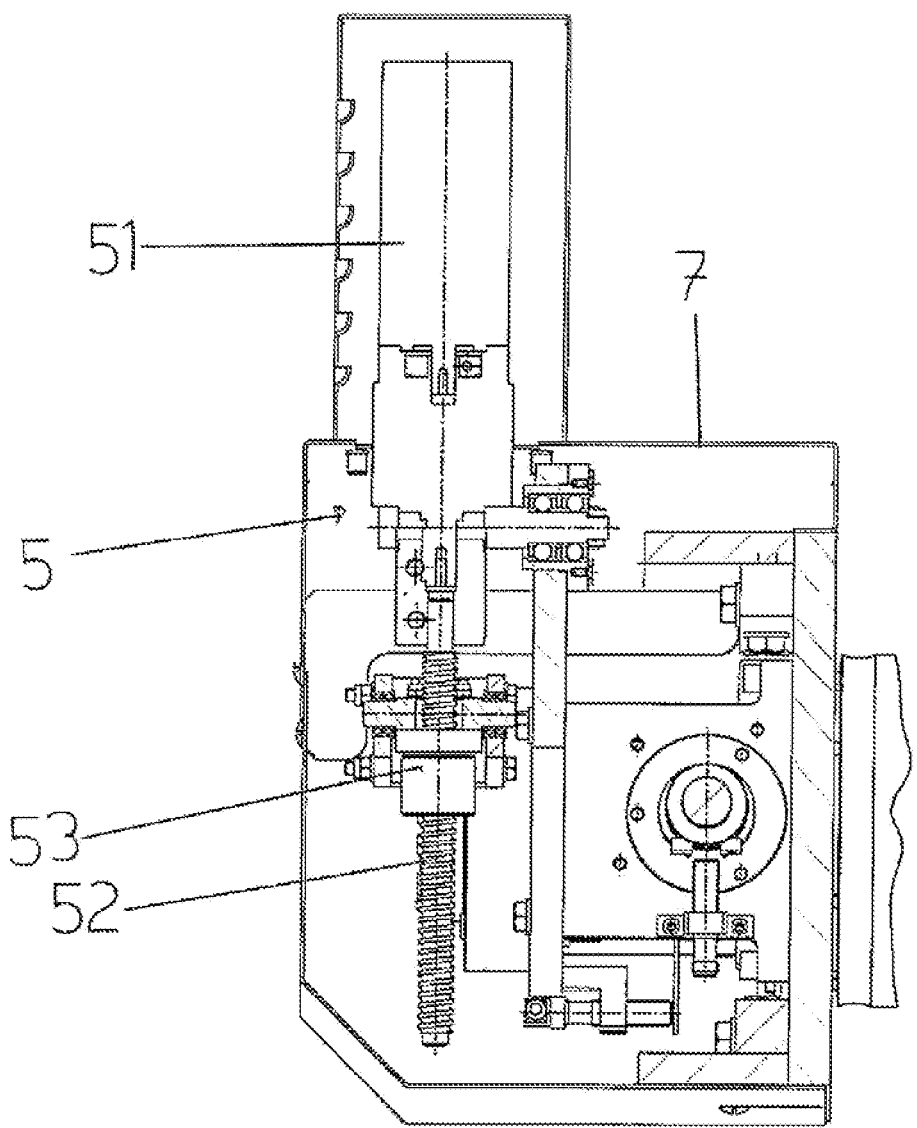
FIG. 6 is a section view along section plane VI-VI of FIG. 3.

In particular, the motor (51) of the first actuator group (5) comprises a brushless electric motor (51), and the series of motion transmission elements (52, 53, 54) of the first actuator group (5) comprise an endless screw (52), a nut screw (53) and a connecting rod (54) (see for example FIG. 2A and FIG. 6).

The endless screw (52) is connected to the brushless motor (51) such as to be placed in rotation in two opposite rotation directions, the nut screw (53) being mounted on the endless screw (52) in order to be able to slide on the screw (52) alternatively in two opposite directions, consequently to the rotation of the screw (52), while the connecting rod (54) is connected at a relative first end to the nut screw (53) and at a relative second end to the end of the second portion (42) of the hub (4) in order to set the hub (4) in two opposite rotation directions consequently to the translation of the nut screw (53) on the screw (52).

Figure 5:
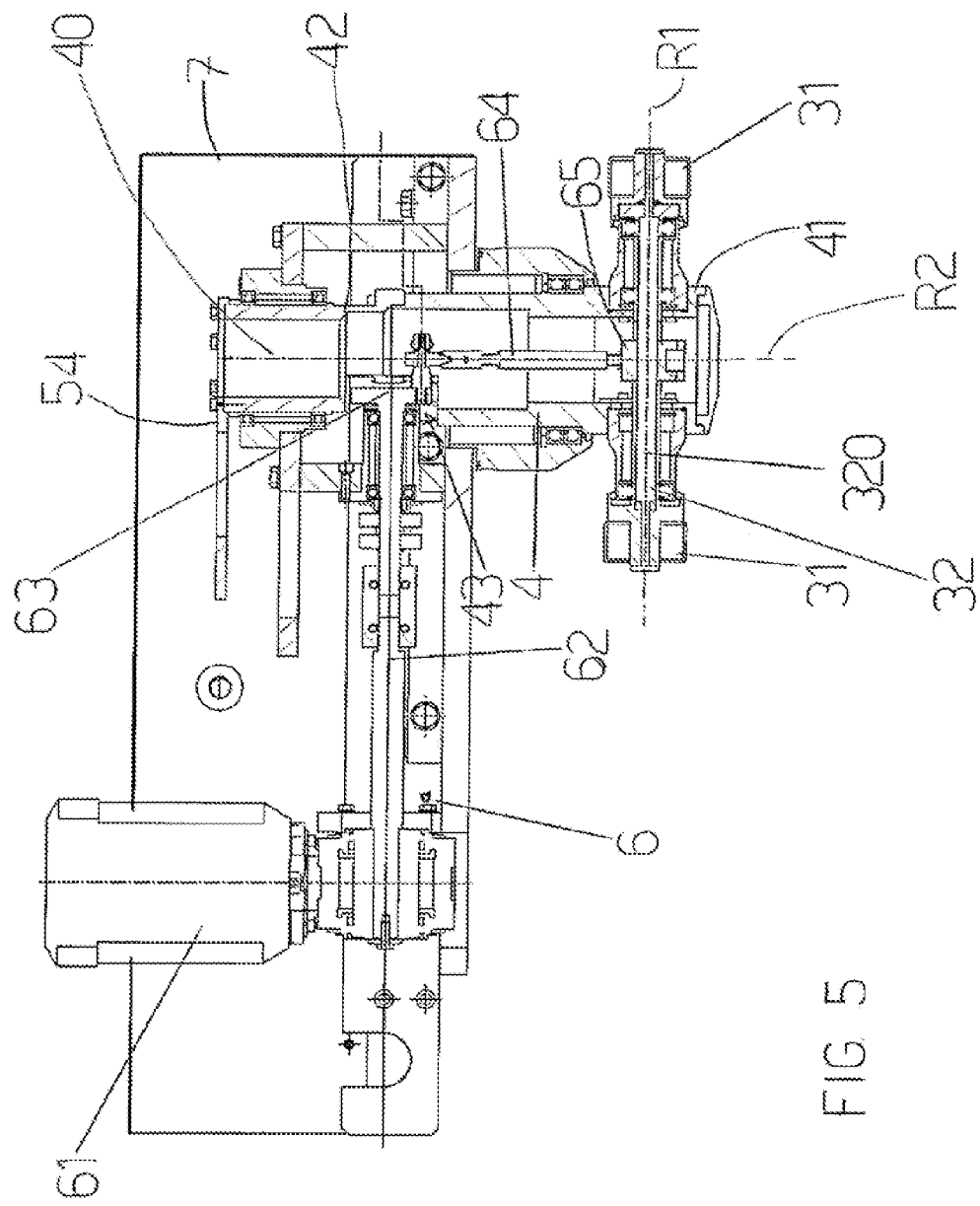
FIG. 5 is a section view along section plane V-V of FIG. 3.

The motor (61) of the second actuator group (6) comprises an alternating-current three-phase electric motor (61) and the series of motion transmission elements (62, 63, 64, 65) of the second actuator group (6) comprise an activating shaft (62), a cam (63), a connecting rod (64) and a crank (65) (see for example FIG. 5 and FIG. 6).

The activating shaft (62) is connected at a first end, to the three-phase electric motor (61), so as to be set in rotation, and with the cam (63) mounted to the second end of the shaft (62), the connecting rod (64) being connected, at a first end, to the cam (63), and, at a second end, to the crank (65) which is predisposed in such a way as to be coupled and mounted rigidly on the shaft (32) of the frame (3).

The second part (42) of the hub (4) exhibits a lateral opening (43) while the electric motor (61) and the activating shaft (62) of the second actuator group (6) are predisposed such that the activating shaft (62) is positioned parallel to the shaft (32) on which the arms (31) of the frame (3) are rigidly mounted and with a part thereof which crosses the lateral opening (43) of the hub (4) such that the relative second end, to which the cam (63) is connected, is situated internally of the hub (4) with the cam (63) positioned such that the connecting rod (64) connected thereto is aligned with and positioned at the rotation axis (40) of the hub (4), i.e. at and aligned with the second rotation axis (R2).

The apparatus (A) further comprises a body (7) which is predisposed in such a way as to be positioned adjacent to and facing the second wall (P2), on an opposite side of the side facing towards the isolated environment (S), with the second part (42) of the hub (4) mounted and borne by the body (7), and the first actuator group (5), with the relative motor (51) and the relative motion transmission means (52, 53, 54) of which it is composed, and with the second actuator group (6), the relative motor (61) and the relative motion transmission elements (62, 63, 64, 65) of which it is composed, predisposed internally of the body (7).

The container element (2) exhibits a shape that is such as to exhibit a bottom (26) and lateral walls (27) which surround the bottom (26) and which circumscribe the internal volume (25) for containing the articles, and the second article unloading opening (22) is realized at the upper part opposite the bottom (26) and the second article unloading opening (22) is made in a position between a lateral wall (27) and the bottom (26).

The container element (2) is further mounted and predisposed on the arms (32) of the frame (3) such that when the container element (2) is moved and positioned in the raised position (PS) with the second unloading opening (22) above the supply zone (V) of the operating station (S1) to be supplied with the articles, the bottom (26) is inclined with respect to the ground so that the articles contained therein are pushed in the opposite direction to the second unloading opening (22), against the opposite lateral wall to the lateral wall at which the second unloading opening (22) is present.

Further, the container element (2) exhibits a slide (28) having a bailer shape predisposed at the second unloading opening (22) such as to direct the articles unloaded from the second unloading opening (22) towards the supply zone (V) of the operating station (S1).

Lastly, the loading system (10) comprises a hatch door (11), predisposed at the hatch (1) and slidable with respect thereto, for opening and closing the hatch (1).

In this way, the hatch (1) can be opened only when articles are loaded into the container element (2), and closed immediately after so as to prevent any contamination of the isolated environment (S1) by any dust or powders or other contaminating agents present in the surrounding external environment.

The invention claimed is:

1. A packing apparatus in a sterile environment comprising a series of walls assembled to one another and predisposed in such a way as to identify and circumscribe an isolated environment from a surrounding environment, the isolated environment having measures to maintain the isolated environment in a sterile and aseptic condition,
the apparatus internally of the isolated environment comprising:
at least one line and a series of operating stations associated with the line for performing a packing operation wherein the series of operating stations comprise an operating station with a supply zone to be supplied with articles to be used for the packing operations, said supply zone being at a height above a ground level;
a loading and supply system for loading and supplying articles to said supply zone, the loading and supply system comprising:
a hatch, located on a first vertical wall of the series of walls, positioned to be facing said operating station, and in a position at a height from the ground level which is below the position of the supply zone from the ground level;
a container element for containing articles, the container element having a bottom, lateral walls which surround the bottom, and an upper part opposite to the bottom so as to define an internal volume for containing articles, the container element having a first load opening in the upper part opposite the bottom and communicating with the internal volume, for loading the articles into the internal volume, and at or in one of said lateral walls a second unloading opening communicating with the internal volume, for unloading the articles from the internal volume,
wherein the loading and supply system has a support frame for supporting the container element internally within the isolated environment, in a zone in proximity of the operating station, the frame being mounted at a second vertical wall of the series of walls which surround the isolated environment, opposite the first vertical wall, the frame being movable in rotation about a first rotation axis parallel to the second vertical wall, to move the container element with respect to both the supply zone of the operating station and the hatch and in order to position the container element in a lowered position, wherein the container element is at the hatch and below the supply zone of the operating station with the first load opening positioned at the hatch to enable loading of the articles into the internal volume via the hatch, and in a raised position, wherein the container element is above the hatch and above the supply zone, with the second unloading opening positioned above the supply zone of the operating station, and with an orientation and configuration such that the articles contained in the internal volume remain within the volume, the frame being further movable in rotation about a second rotation axis, perpendicular to the first rotation axis and perpendicular to the second vertical wall, to rotate the container element movable in rotation about the second rotation axis so that, when the container element is positioned in the raised position, the articles contained in the internal volume are directed towards the second unloading opening for unloading the container element to the outside at the supply zone of the operating station.

2. The packing apparatus of claim 1, wherein the frame, when the container element has been positioned in the raised position, is movable in an alternating oscillating rotation about the second rotation axis, so as to control and regulate the unloading of the articles from the second unloading opening towards the supply zone of the operating station which will receive the articles.

3. The packing apparatus of claim 1, wherein the container element has a bottom and lateral walls which surround the bottom and which define the internal volume for receiving the articles, and wherein the second article unloading opening is positioned between one lateral wall and the bottom, the frame having two arms, the container element being mounted on the arms of the frame so that when the container element is moved and positioned in the raised position with the second unloading opening above the operating station supply zone, the bottom is inclined so that the articles contained therein are pushed in an opposite direction relative to the second unloading opening.

4. The packing apparatus of claim 1, further comprising a hatch door located at the hatch and being slidable with respect thereto, for opening and closing the hatch.

5. A packing apparatus in a sterile environment comprising a series of walls assembled to one another and predisposed in such a way as to identify and circumscribe an isolated environment from a surrounding environment, the isolated environment having measures to maintain the isolated environment in a sterile and aseptic condition,
the apparatus internally of the isolated environment comprising:
at least one line and a series of operating stations associated with the line for performing a packing operation wherein the series of operating stations comprise an operating station with a supply zone to be supplied with articles to be used for the packing operations, said supply zone being at a height above a ground level;
a loading and supply system for loading and supplying articles to said supply zone, the loading and supply system comprising:
a hatch, located on a first vertical wall of the series of walls, positioned to be facing said operating station, and in a position at a height from the ground level which is below the position of the supply zone from the ground level;

a container element for containing articles having an internal volume for containing articles;

a first load opening communicating with the internal volume, for loading the articles into the internal volume, and a second unloading opening, communicating with the internal volume, for unloading the articles from the internal volume, the container element being positioned internally within the isolated environment in a zone in proximity to the operating station which is to be supplied with the articles, and being movable both with respect to the operative station and the hatch so as to be positionable in a lowered position at the hatch, so that the first load opening is positioned at the hatch to enable loading of the articles into the internal volume via the hatch and thereafter being movable to a raised position so that the second unloading opening is positioned above the supply zone for the operating station and with an orientation and configuration such that the articles contained in the internal volume remain within the volume, and, when in the raised position, the container element is further movable so that the articles contained in the internal volume are directed towards the second unloading opening for unloading to an outside the container element at the supply zone;

wherein the loading and supply system has a support frame for supporting the container element, positionable internally within the isolated environment, in a zone in proximity of the operating station, and mounted with respect to a second wall which surrounds the isolated environment opposite the first vertical wall, and being movable in rotation about a first rotation axis parallel to the second wall, so that the container element is positionable in the lowered position and in the raised position, and further is movable in rotation about a second rotation axis, perpendicular to the first rotation axis and perpendicular to the second wall, such that the container element, when positioned in the raised position, is movable in rotation about the second rotation axis, in such a way that the articles contained in the internal volume are directed towards the second unloading opening for unloading the container element to the outside at the supply zone of the operating station, the frame, when the container element has been positioned in the raised position, being movable in an alternating oscillating rotation about the second rotation axis, so as to control and regulate the unloading of the articles from the second unloading opening towards the supply zone of the operating station which will receive the articles, further comprising a hub, having a rotation axis, the hub mounted at the second wall so as to sealingly cross the second wall, and being rotatable with respect thereto about the rotation axis thereof, the hub having a first portion internally within the isolated environment and a second portion externally thereof, the hub being predisposed on the second wall such that the rotation axis coincides with the second rotation axis of the frame, wherein the frame has two arms and a shaft having a shaft rotation axis, the two arms being rigidly mounted on ends of the shaft, the shaft being mounted so as to cross the first portion of the hub, which is internal of the isolated environment, such that the shaft rotation axis is perpendicular to the hub axis and coincides with the first rotation axis of the frame, the shaft being activatable in rotation about the shaft rotation axis and therefore about the first rotation axis to set the arms and the frame in rotation, and thus the container element, about the first rotation axis such that the container element is movable in rotation and positionable in the lowered position and in the raised position.

6. The packing apparatus of claim 5, further comprising a first actuator group and a second actuator group which are disposed externally of the second wall, the first actuator group having a first motor and a series of motion transmission elements connected to the second portion of the hub for activating the hub in rotation and in alternating oscillating motion about the hub rotation axis and therefore of the frame and the container element about the second rotation axis, the second actuator group having a second motor and a series of motion transmission elements connected to the frame shaft, to the ends of which the two arms of the frame are rigidly connected, for activation in rotation of the shaft about the shaft rotation axis and therefore of the frame and the container element about the first rotation axis.

7. The packing apparatus of claim 6, wherein the first motor is a brushless electric motor, and wherein the series of motion transmission elements of the first actuator group include an endless screw, a nut screw and a connecting rod, the endless screw being connected to the brushless motor so as to be rotatable in two opposite rotation directions, the nut screw being mounted on the endless screw and slidable on the screw alternatively in two opposite directions, the connecting rod being connected at a relative first end to the nut screw and at a relative second end to an end of a second portion of the hub, to rotate the hub in two opposite rotation directions in correspondence to a translation of the nut screw on the endless screw.

8. The packing apparatus of claim 7, further comprising a body positioned adjacent to and facing the second wall, on an opposite side of a side facing towards the isolated environment, the second hub portion and borne by the body, the first actuator group and the second actuator group disposed internally of the body.

9. The packing apparatus of claim 6, wherein the second motor is an alternating-current three-phase electric motor and the series of motion transmission elements of the second actuator group including an activating shaft, a cam, a connecting rod and a crank, the activating shaft being connected, at a first end, to the three-phase electric motor, for rotation thereof, the cam being mounted to a second shaft end, the connecting rod being connected, at a first end, to the cam, and at a second end, to the crank which is configured to be coupled and mounted rigidly on the shaft of the frame.

10. The packing apparatus of claim 9, wherein the second hub portion has a lateral opening, the alternating-current three-phase electric motor and the activating shaft disposed so that the activating shaft is positioned parallel to the shaft on which the arms of the frame are rigidly mounted, a part thereof crossing the lateral opening of the hub such that the second end to which the cam is connected, is situated internally of the hub, the cam positioned so that the connecting rod connected thereto is aligned with and positioned at the hub rotation axis, at and aligned with the second rotation axis.

11. The packing apparatus of claim 10, further comprising a body positioned adjacent to and facing the second wall, on an opposite side of a side facing towards the isolated environment, the second hub portion mounted and borne by the body, the first actuator group and the second actuator group disposed internally of the body.

12. The packing apparatus of claim 9, further comprising a body positioned adjacent to and facing the second wall, on an opposite side of a side facing towards the isolated environment, the second hub portion mounted and borne by the body, the first actuator group and the second actuator group disposed internally of the body.

13. The packing apparatus of claim 6, further comprising a body positioned adjacent to and facing the second wall, on an opposite side of a side facing towards the isolated environment, the second hub portion mounted and borne by the body, the first actuator group and the second actuator group disposed internally of the body.

14. A packing apparatus in a sterile environment comprising a series of walls assembled to one another and predisposed in such a way as to identify and circumscribe an isolated environment from a surrounding environment, the isolated environment having measures to maintain the isolated environment in a sterile and aseptic condition, the apparatus internally of the isolated environment comprising:

at least one line and a series of operating stations associated with the line for performing a packing operation wherein the series of operating stations comprise an operating station with a supply zone to be supplied with articles to be used for the packing operations, said supply zone being at a height above a ground level;

a loading and supply system for loading and supplying articles to said supply zone, the loading and supply system comprising:

a hatch, located on a first vertical wall of the series of walls, positioned to be facing said operating station, and in a position at a height from the ground level which is below the position of the supply zone from the ground level;

a container element for containing articles having an internal volume for containing articles;

a first load opening communicating with the internal volume, for loading the articles into the internal volume, and a second unloading opening, communicating with the internal volume, for unloading the articles from the internal volume, the container element being positioned internally within the isolated environment in a zone in proximity to the operating station which is to be supplied with the articles, and being movable both with respect to the operative station and the hatch so as to be positionable in a lowered position at the hatch, so that the first load opening is positioned at the hatch to enable loading of the articles into the internal volume via the hatch and thereafter being movable to a raised position so that the second unloading opening is positioned above the supply zone for the operating station and with an orientation and configuration such that the articles contained in the internal volume remain within the volume, and, when in the raised position, the container element is further movable so that the articles contained in the internal volume are directed towards the second unloading opening for unloading to an outside the container element at the supply zone;

wherein the loading and supply system has a support frame for supporting the container element, positionable internally within the isolated environment, in a zone in proximity of the operating station, and mounted with respect to a second wall which surrounds the isolated environment, opposite the first vertical wall, and being movable in rotation about a first rotation axis parallel to the second wall, so that the container element is positionable in the lowered position and in the raised position, and further is movable in rotation about a second rotation axis, perpendicular to the first rotation axis and perpendicular to the second wall, such that the container element, when positioned in the raised position, is movable in rotation about the second rotation axis, in such a way that the articles contained in the internal volume are directed towards the second unloading opening for unloading the container element to the outside at the supply zone of the operating station, wherein the container element has a bottom and lateral walls which surround the bottom and which define the internal volume for receiving the articles, and wherein the second article unloading opening is positioned between one lateral wall and the bottom, the frame having two arms, the container element being mounted on the arms of the frame so that when the container element is moved and positioned in the raised position with the second unloading opening above the operating station supply zone, the bottom is inclined so that the articles contained therein are pushed in an opposite direction relative to the second unloading opening, wherein the container element has a slide having a bailer shape located at the second unloading opening for directing the articles unloaded from the second unloading opening towards the operating station supply zone.

* * * * *